United States Patent [19]
Ausschnitt et al.
[11] 4,166,219
[45] Aug. 28, 1979

[54] DETECTION OF GROUND STATE HYDROGEN AND DEUTERIUM

[75] Inventors: Christopher P. Ausschnitt, Holmdel; Gary C. Bjorklund, Cranbury; Richard R. Freeman, Red Bank; Ralph H. Storz, Freehold, all of N.J.

[73] Assignee: Bell Telephone Laboratories, Incorporated, Murray Hill, N.J.

[21] Appl. No.: 907,591

[22] Filed: May 19, 1978

[51] Int. Cl.$^2$ ........................ B01D 59/44; H01J 39/34
[52] U.S. Cl. ................................ 250/423 P; 250/283
[58] Field of Search .................... 250/423 P, 281, 282, 250/283; 204/DIG. 1

[56] References Cited

U.S. PATENT DOCUMENTS

| | | | |
|---|---|---|---|
| 3,453,429 | 7/1969 | Duguay et al. | 250/71 |
| 3,914,655 | 10/1975 | Dreyfus et al. | 250/423 P |

OTHER PUBLICATIONS

"Multiphoton Ionization of H and Rare-Gas Atoms" Bebb et al., Phy. Rev., vol. 143, No. 1, Mar. 1966, pp. 1-24.
"Theory of Three-Photon Ionization of the Alkali Atoms", Bebb, Phy. Rev., vol. 153, No. 1, Jan. 1967, pp. 23-28.
"Saturated Two-Photon Resonance Ionization of He(2'S)", Hurst et al., Phy. Rev. Let., vol. 35, No. 2, Jul. 1975, pp. 82-85.
"Multiphoton Ionization Spectroscopy: A New State of Benzene", Johnson J. of Chem. Phy., vol. 62, No. 11, Jun. 1975, pp. 4562-4563.
"Doppler-Free Two-Photon Spectroscopy of Hydrogen 1S-2S" Hansch et al., Phy. Rev. Letters, vol. 34, No. 6, Feb. 1975, pp. 307-309.
"Resonant Enhancement of Two-Photon Absorption in Na Vapor" Bjorklund et al., Phy Rev. Let., vol. 33, No. 3, Jul. 1974, pp. 128-131.
"A Demonstration of One-Atom Detection" Hurst et al., App. Phy. Letters, vol. 30, No. 5, Mar. 1977, pp. 229-231.
"Optogalvanic Spectroscopy", King et al., Laser Focus Mar. 1978, pp. 50-57.
"Kinetics of He(2'S) Using Resonance Ionization Spect.", Payne et al., Phy. Rev. Let., vol. 35, No. 17, Oct. 1975, pp. 1154-1156.
"Multiphoton Excitation and Ionization of Atomicc $C_S$ with a Tunable Laser", Popescu et al., Phy. Rev. A, vol. 9, No. 3, Mar. 1976, pp. 1182-1187.

*Primary Examiner*—Bruce C. Anderson
*Attorney, Agent, or Firm*—Daniel D. Dubosky

[57] ABSTRACT

Atoms of hydrogen or deuterium are fully ionized by a three-photon process which is enhanced by the two-photon 1S→2S resonant transition. The resultant ions are detected with high efficiency to provide discrimination between small concentrations of atomic hydrogen and atomic deuterium in a vacuum or in the presence of a background gas. The use of two unequal photo energies to pump the two-photon resonance provides the capability of mapping the individual three dimensional distribution of the hydrogen or deuterium. The detection process is also appropriate to determining these data in dishcarge plasmas and flames.

7 Claims, 10 Drawing Figures

DETECTION OF GROUND STATE HYDROGEN AND DEUTERIUM

BACKGROUND OF THE INVENTION

The invention pertains to the field of detecting and discriminating between small concentrations of atomic hydrogen and atomic deuterium.

The properties of atomic hydrogen and deuterium are of fundamental interest for atomic physics, astrophysics, chemistry, surface physics, and plasma physics. Current efforts to achieve controlled fusion both by magnetic and inertial confinement require techniques for studying and monitoring the characteristics of plasmas and in particular, hydrogen plasmas. There is great interest in being able to detect small concentrations of atomic hydrogen in a vacuum or in the presence of a background gas, in being able to detect small concentrations of atomic deuterium in a vacuum or in the presence of a background gas, and in being able to discriminate between the two. An application of laser techniques in devising methods for performing these tasks is found in "Doppler-Free Two-Photon Spectroscopy of Hydrogen 1S→2S" by T. W. Hänsch, S. A. Lee, R. Wallenstein and C. Wieman, *Physical Review Letters,* Vol. 34, No. 6, Feb. 10, 1975, pp. 307–309. The article discloses an apparatus for performing an experiment to study the 1S→2S transition in atomic hydrogen and deuterium by Doppler-free two-photon spectroscopy using a frequency-doubled pulsed dye-laser at 2430 Å. The atoms were excited by absorption of two photons of wavelength 2430 Å and the excitation was monitored by observing the subsequent collision-induced 2P→1S fluorescence at the $L_\alpha$ wavelength 1215 Å. The gas was exposed to counter-propagating beams. The experiment discloses a problem in that the $L_\alpha$ line signal is reduced due to resonant absorption by other hydrogen or deuterium atoms. This required a small separation between the illuminated region of the gas and the $L_\alpha$ detection windows. Filters are also required to reduce the off-resonance background signals. A further problem results from the use of counter-propagating laser beams. This causes $L_{60}$ to be generated along the entire region of exposure and does not allow one to map the spatial distribution of the hydrogen or deuterium in three dimensions. Thus, this technique suffers because the resonant $L_\alpha$ emission is self-trapped or may be absorbed by a background buffer gas. This makes efficient detection of the excitation difficult. This type of emission spectroscopy as applied to plasmas consists of the passive monitoring of side light from the plasma. Consequently, the spatial and temporal resolution is poor. In an optically thick plasma, only the outer sheath of the plasma can be studied. For plasma constituents whose ground state transitions lie in the VUV, monitoring emission from the first excited state is complicated by the special optics required. Finally, the ground state density cannot be determined directly by emission measurements.

Multiphoton-ionization spectroscopy has been used as a tool for spectroscopic investigations of atoms and molecules. In particular, this is discussed in "Multiphoton Excitation and Ionization of Atomic Cesium with a Tunable Dye-Laser" by D. Popescu, C. B. Collins, B. W. Johnson and I. Popescu, *Physical Review A,* Vol. 9, No. 3, March 1976, pp. 1182–1187. The article discloses an apparatus for performing multiphoton ionization spectroscopy in atomic cesium. It discusses three-photon ionization of cesium as a method by which specific two-photon electronic transitions may be studied. The method involves the use of a single frequency tunable laser whose frequency lies near a single photon resonance in cesium to provide an enhanced two-photon excitation. This method of utilizing a laser frequency which is nearly resonant with an intermediate single photon transition is inappropriate in hydrogen or deuterium because there is no such convenient state lying between the 1S and 2S states in hydrogen. The method of using a single laser frequency causes ions to be generated along the entire path of the laser beam through the gas and will not enable a three dimensional spatial mapping of the distribution of atoms to be made.

Monitoring of ground state densities of plasma constituents by monitoring fluorescence after single photon resonant excitation is complicated by the difficulty of generating coherent photons for transitions in the VUV, and cannot be used to probe within optically dense plasmas. A further difficulty is the poor signal-to-noise ratio obtained from a weak optical signal (fluorescence) which is detected against the strong emission background of the plasma.

Lastly, optogalvanic spectroscopy for determining the properties of plasma constituents involves the measurement of the change in the voltage drop across a plasma due to the single photon resonant excitation of a plasma constituent. Because this technique relies on ionization by electron collision subsequent to the absorption of a photon, the voltage changes are small, typically less than 1 percent of the total drop. This limits the dynamic range and resolution of the technique. Furthermore, optogalvanic spectroscopy suffers from the same drawbacks as resonant fluorescence in exciting VUV ground state transitions. And lastly, this technique does not provide a method for obtaining a three-dimensional spatial map of an optically dense plasma.

SUMMARY OF THE INVENTION

In accordance with the present invention, an apparatus for multiphoton ionization detection of atomic hydrogen and atomic deuterium is provided which (a) discriminates between small concentrations of these elements in a vacuum or in the presence of a background gas, (b) spatially maps the three-dimensional distributions of these elements, (c) determines the time resolved concentration maps of these elements, and (d) determines the temperature of the elements by detecting Doppler broadened line widths in three-dimensional volumes. The invention also provides these features in discharge plasmas.

Atoms of hydrogen or deuterium are fully ionized by a three-photon ionization process which is enhanced by a two-photon 1S→2S transition. Two laser beams of energy E1 and E2 respectively impinge on the same volume of space at the same time. The energies $E_1$ and $E_2$ are selected such that (a) $E_1$ and $E_2$ are unequal and not resonant with single photon transitions (note also that the $E_1$ is not equal to half the energy difference between the 1S and 2S states), (b) the sum of $E_1$ and $E_2$ may be tuned to coincide with the 1S→2S transition in either atomic hydrogen or atomic deuterium, and (c) $E_1$ is sufficient to ionize either atomic hydrogen or atomic deuterium from the 2S state. The concentration of each of the gases is determined by collecting the ions produced by the photoionization.

The spatial distribution of each gas is determined by having the two laser beams interact in the same small volume of the gas. The results obtained depend upon the following:

(a) The ionization process requires photons from each beam for resonant enhancement because photons from one beam alone will not excite the two-photon resonance (note the importance of the fact that $E_1$ is not equal to $E_2$ and they both are not equal to half the energy difference between the 1S and 2S states).

(b) The energy of the two laser beams are not resonant with any single photon transition so that photons from the beam are not absorbed by the gases, i.e., the gases are transparent to the two beams except at the point where they overlap.

One feature of the invention is the multiphoton ionization detection of atomic hydrogen and atomic deuterium by laser wavelengths which pass easily through air, quartz windows and many molecular vapors of photochemical interest. This allows the apparatus to be used with thick targets because the problem of the absorption of the laser radiation has been solved.

Yet another feature of the invention is that the ionization signal is linear with concentrations up to $1.5\times10^{14}$ atoms/cm$^3$. Yet another feature of the invention is that the saturation of the ionization can be achieved in focal volumes as large as $2\times10^{-4}$ cm$^3$.

Yet another feature of the invention is a dynamic range of measurement of $4\times10^4$ in concentration with a time resolution on the order of 10 nsec with concentrations as low as $4\times10^9$ atoms/cm$^3$ in the presence of $10^{17}$ atoms/cm$^3$ buffer gas.

Yet another feature of the invention is that the temperature of the ground state hydrogen and deuterium can be determined by reducing the bandwidths of the laser beams and keeping the intensities below the saturation level in order that the measured widths of the two-photon resonances are dominated by Doppler broadening.

Yet another feature of the invention is the use of 266 nm radiation produced as the fourth harmonic of a commercial Nd:YAG laser and the use of tunable 224 nm radiation produced by pumping a dye-laser amplifier with the Nd:YAG second harmonic, frequency doubling the output radiation in a first angle tuned KDP crystal, and then summing the resultant with the 1.064 μm Nd:YAG fundamental in a second angle tuned KDP crystal. This advantageously allows use of a commercially available laser and commercially available KDP crystals.

Yet another feature of the invention is the ability to perform three-dimensional probing within an optically dense plasma.

Yet another feature of the invention results because 100 percent ionization can be achieved in a region as large as $10^{-4}$ cm$^3$ to produce large electrical signals resulting in a high signal-to-noise ratio and a large dynamic range for discharge plasmas.

Yet another feature of the invention is achieved when short laser pulses are used to provide high temporal resolution for rapid monitoring of the plasma dynamics.

Yet another feature of the invention is the ability to measure the ratio between the fraction of hydrogen or deuterium atoms that have been excited to the 2S state as compared to those in the ground state.

Yet another feature of the invention is that the two-photons connect states of the same parity and the 2S state thus reached is metastable with respect to the ground state. This allows much larger populations to be achieved in this excited state than can be achieved by the prior art.

BRIEF DESCRIPTION OF THE DRAWING

A complete understanding of the present invention and of the above and other features thereof may be gained from a consideration of the following detailed description presented hereinbelow in connection with the accompanying diagram in which.

DETAILED DESCRIPTION OF THE DRAWING

Figure 1:
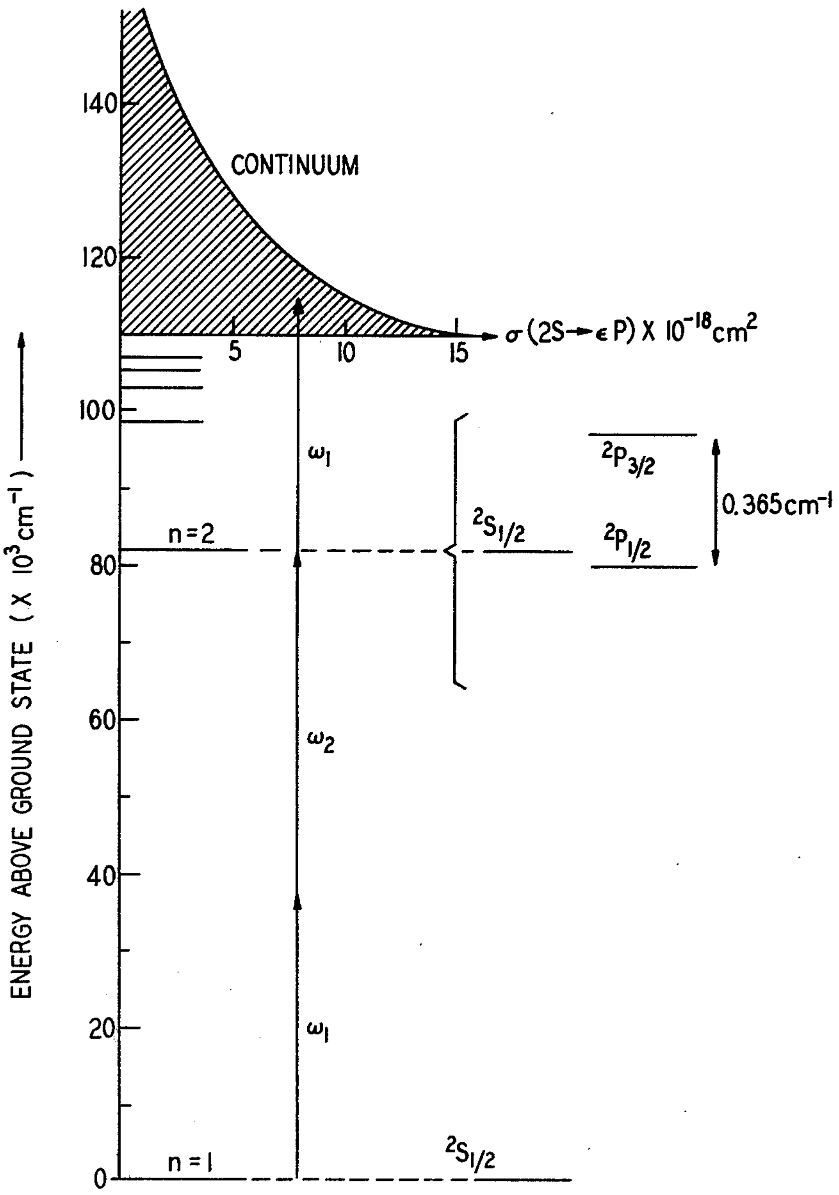
FIG. 1 shows a diagram of the relevant energy levels for the three-photon ionization process.

FIG. 1 shows a schematic diagram of the energy levels in atomic hydrogen which are pertinent to the three-photon ionization process. Ionization from the $1S_{\frac{1}{2}}$ ground state is produced by absorption of three photons, two at frequency $\omega_1$ and one at frequency $\omega_2$. The radiation at $\omega_1$ is fixed to be at a wavelength of 266 nm while the radiation at $\omega_2$ is tunable about a wavelength of 224 nm. The ionization is resonantly enhanced by tuning the radiation at $\omega_2$ such that $\omega_1+\omega_2$ is resonant with the 1S→2S two-photon transition at 82259 cm$^{-1}$ in atomic hydrogen or with the 1S→2S two-photon transition at 82281 cm$^{-1}$ in atomic deuterium. The other three-photon process which is also resonantly enhanced, that is, the absorption of two photons at frequency $\omega_2$ and one at $\omega_1$ is suppressed by keeping the power density of the beam at frequency $\omega_1$ much greater than that of the beam at frequency $\omega_2$. Note that neither the photons from the beam at frequency $\omega_1$ nor the photons from the beam at frequency $\omega_2$ are resonant with an intermediate level in atomic hydrogen or atomic deuterium. This gives the important result that significant ionization can only occur in the simultaneous presence of both beams.

Figure 2:
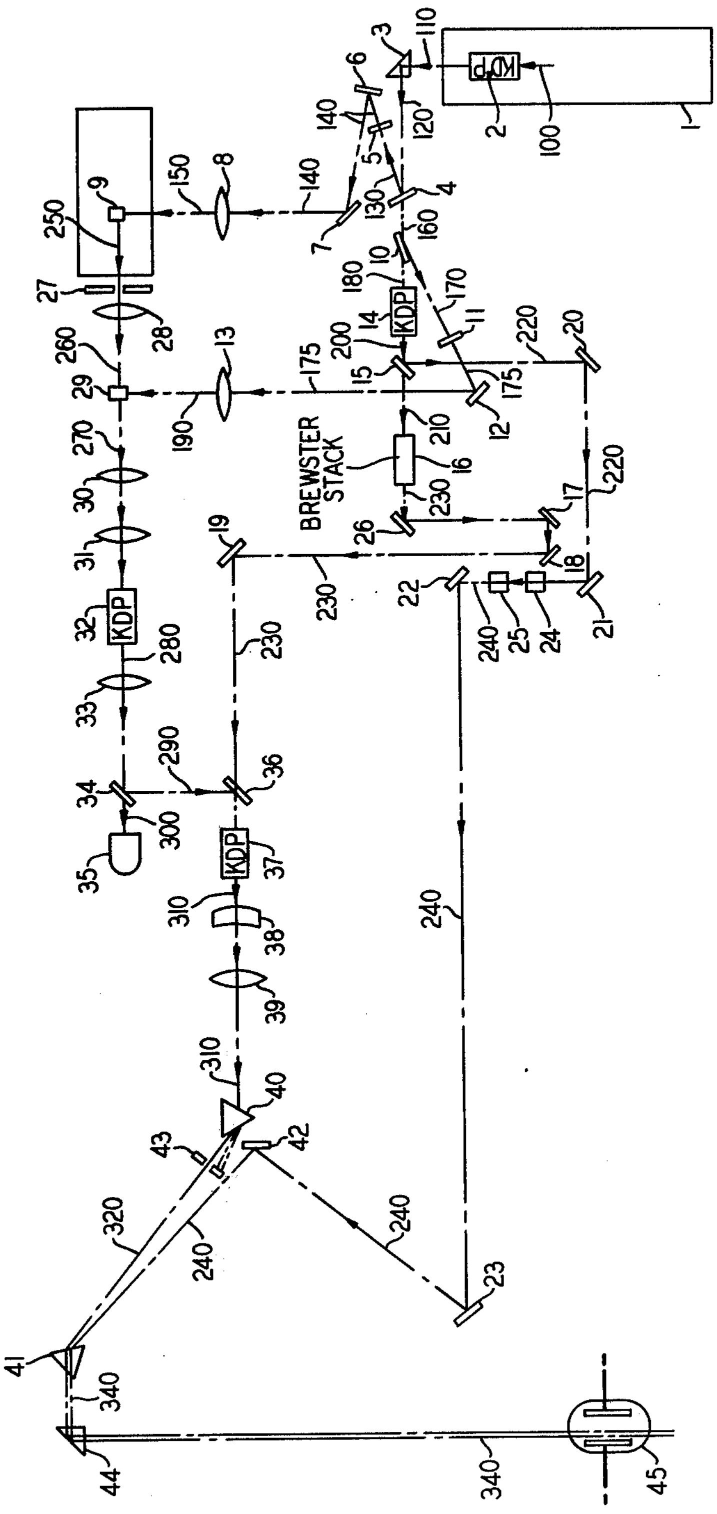
FIG. 2 shows in partially pictorial, partially schematic form the method for generating the laser beams in an embodiment in which the principal of operation was demonstrated.
Figure 3:
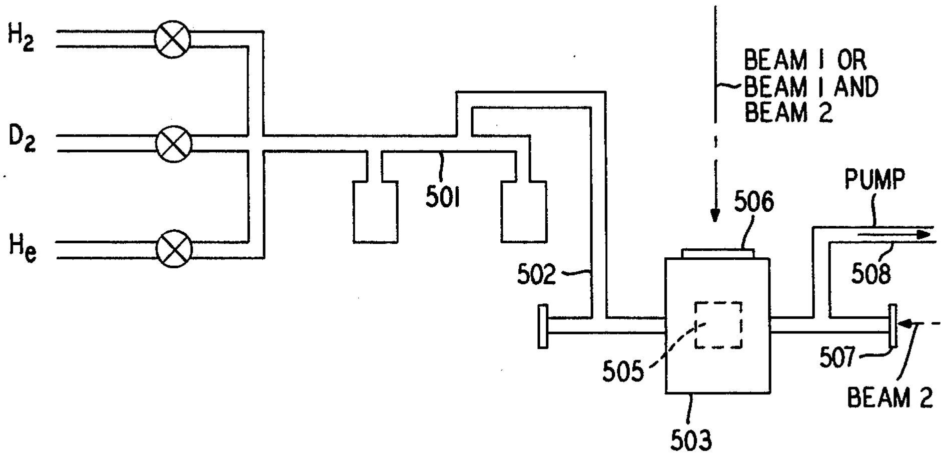
FIG. 3 shows in partially pictorial, partially schematic form the top view of the ionization cell in an embodiment in which the principal of operation was demonstrated.
Figure 9:
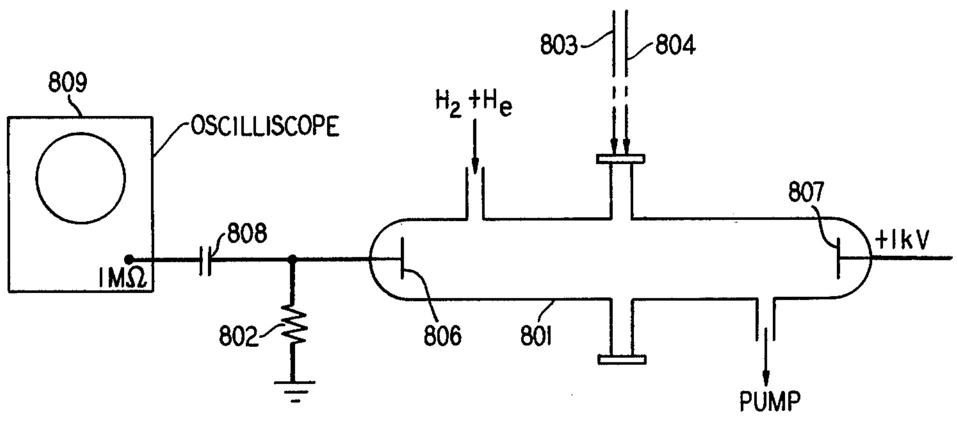
FIG. 9 shows in partially pictorial, partially schematic form, the side view of an embodiment in which the principal of operation was demonstrated in a plasma discharge.

FIG. 2 depicts the method of generating the laser beams for the embodiments shown in FIG. 3 and in FIG. 9 in which the principal of operation was demonstrated. The fixed frequency radiation at 226 nm was produced as the fourth harmonic of laser 1. The radiation tunable about 224 nm was produced by pumping dye-laser 9 and amplifier 29 with the Nd:YAG second harmonic to produce radiation tunable at 566 nm, frequency doubling this radiation in angle tuned KDP crystal 32, and then summing the resultant radiation tunable at 283 nm with the radiation at 1.064 μm from the Nd:YAG in second angle tuned KDP crystal 37.

Laser 1, a commercial Q-switched 10 pps Nd:YAG laser, produces beam 100 which is incident on KD*P crystal 2 (oriented at 37°) to form beam 110 having radiation at both 1.064 μm and 0.532 μm by second harmonic generation. Beam 110 is bent by 90° UV quartz prism 3 to form beam 120, which is incident on quartz flat 4 to form beams 130 and 160. Beam 130 passes through filter 5, Corning filter No. CS-1-75, to remove the 1.064 μm component and emerges as beam 140. Beam 140 is then reflected by reflectors 6 and 7, having a 99 percent reflectance at 0.5320 μm, so that it may be focused by lens 8 to form beam 150. Beam 150 is used to pump the tunable Hänsch dye laser 9.

Beam 160, containing radiation at both 1.064 μm and 0.5320 μm, impinges on quartz flat 10 to form beams 170 and 180. Beam 170 passes through filter 11, Corning filter No. CS-1-75, to remove the 1.064 μm component and emerges as beam 175. Beam 175 is reflected by reflector 12, having a 99 percent reflectance at 0.5320 μm, so that it may be focused by lens 13 to form beam 190.

Beam 180, containing radiation at both 1.064 μm and 0.5320 μm impinges on KDP crystal 14 (oriented at 77°) to form beam 200 having radiation at 1.064 μm, 0.5320 μm and 0.2660 μm by second harmonic generation. Beam 200 impinges on reflector 15, having a reflectance of 99 percent at 0.2660 μm, to form beam 210 having radiation at 1.064 μm and 0.5320 μm and beam 220 having radiation at 0.2660 μm.

Beam 210 is sent through Brewster stack 16 to remove the radiation component at 0.5320 μm and form beam 230. Beam 230 is sent into the optical delay line made up of reflectors 26, 17, 18, and 19 which all have a 99 percent reflectance at 1.064 μm.

The polarization of beam 220 is rotated by 90 degrees as it is sent through the optical delay line made up of reflectors 20, 21, 22 and 23, which all have a 99 percent reflectance at 0.2660 μm, by passing successively through rotator 24 (45° at 0.532 μm) and rotator 25 (90° at 0.2128 μm) to form beam 240.

Beam 250, the output of dye-laser 9 having radiation tunable about 0.566 μm, passes through aperture 27 and is focused by lens 28 to form beam 260. Beam 260 and beam 190 are both focused into dye amplifier 29. Beam 270, which is output from dye amplifier 29 and has radiation tunable about 0.566 μm, is focused by lenses 30 and 31 onto KDP crystal 32 (oriented at 65°) to form beam 280 having radiation tunable at 0.566 μm and 0.283 μm by second harmonic generation. Beam 280 is focused by lens 33 and reflected from reflector 34, having a reflectance of 99 percent at 0.2660 μm, and high reflectivity at 0.283 μm to form beam 290. Beam 290 has radiation which is tunable about 0.283 μm. The component of beam 280 containing radiation about 0.566 μm passes through reflector 34 to form beam 300 which is absorbed by black box 35.

Beam 290, containing radiation tunable about 0.283 μm is reflected off reflector 36, having a 99 percent reflectance at 0.2660 μm and high reflectance at 0.283 μm at the same time beam 230 containing radiation at 1.064 μm passes therethrough. Thus, beams 290 and 230 simultaneously impinge on KDP crystal 37 (oriented at 76°). KDP crystal 37 sums the beams to form beam 310 having a radiation component at 1.064 μm, a component tunable about 0.283 μm and a component tunable about 0.224 μm. Beam 310 is collimated by lenses 38 and 39 and passed through 60° UV quartz prism 40 so as to disperse the different wavelength components. Beam 310 then passes through aperture 43 and emerges as beam 320. Beam 320 only contains a radiation component which is tunable about 0.224 μm. Beam 320 impinges on prism 41 at the same time that beam 240, which is reflected by reflector 42 having a 99° reflectance at 0.2660 μm, impinges on prism 41. The angles at which beams 310 and 240 impinge upon 60° UV quartz crystal 41 are such as to give output beam 340 having a component at 0.266 μm and a component tunable about 0.224 μm which are collinear in space and time. Beam 340 is then sent through ionization cell 45 by prism 44. This particular figure illustrates the particular feature of producing the two laser beams collinearly and may be easily varied to illustrate the embodiment where they impinge in crossed directions upon ionization cell 45.

The radiation at 0.266 μm had a 6 nsec pulse duration (full width at half maximum), up to 1 MW peak power, and a 1 $cm^{-1}$ bandwidth. The radiation tunable at 0.224 μm had a 4 nsec pulse duration, up to 10 kW peak power, and a 1 $cm^{-1}$ bandwidth.

The principal of operation and efficiency of the invention has been demonstrated in the embodiment shown in FIG. 3. Mixtures of atomic hydrogen, atomic deuterium, $H_2$, $D_2$ and He were produced by flowing mixtures of $H_2$, $D_2$ and He through a 75 cm long, 7 mm inside diameter Wood discharge tube 501 with a 100 mA dc discharge current and a 10 KΩ ballast resistor. At the entrance to the discharge tube, the He partial pressure was maintained at about 5 Torr, while the $H_2$ and $D_2$ partial pressures were each individually varied between 0 and 1 Torr. The gas mixtures were then pumped via pump outlet 508 from the discharge region 501 through 50 cm glass tubing 502 into ionization cell 503. Ionization cell 503 consisted of a glass vessel containing two parallel 2.5 cm square planar material electrodes 505 separated by 2.5 cm and equipped with quartz windows 506 and 507 which allowed either collinearly propagating or orthogonally intersecting laser beams to irradiate the region between the electrodes. The electrodes 505 and the interior glass surface of ionization cell 503 were coated with phosphoric acid to inhibit catalytic recombination of the atomic hydrogen or atomic deuterium.

Figure 4:
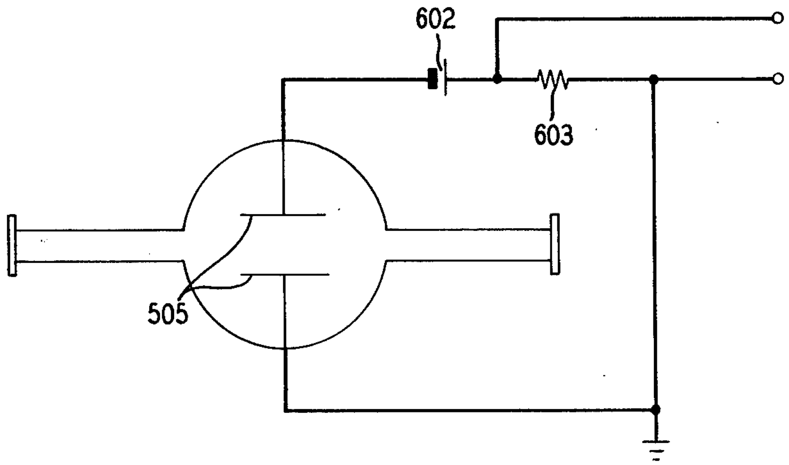
FIG. 4 shows in partially pictorial, partially schematic form the side view of the ionization cell in an embodiment in which the principal of operation was demonstrated.

The ionization signal was detected as shown in FIG. 4, as a transient voltage drop across a 200 kΩ resistor 603 connected in series with dc voltage source 602 across electrodes 505. The signal in all cases was large enough to be displayed directly on an oscilloscope with a differential amplifier plug-in and had a broad asymmetric shape with approximately 75μ duration. The amplitude of the ionization signal was taken to be the peak amplitude of the pulse and the limit of sensitivity corresponded to 2 μV.

The ionization signal was measured as a function of H or D concentration with resonant laser beam intensities and with the radiation tunable about 0.224 μm (hereafter referred to as $\omega_2$ and the laser beam radiation at 0.266 μm hereinafter referred to as $\omega_1$) tuned so that $\omega_1$ and $\omega_2$ was exactly resonant with the 1S→2S transition.

The $\omega_1$ and $\omega_2$ beams, with respective peak powers of 1 MW and 10 kW were collinearly propagating and were focused to a spot size (defined as $\pi r_0^2$, where $r_0$ is the beam waist radius) of $5\times10^{-4}$ cm$^2$ with coincident beam waist locations. Under these conditions, the ionization signal was strongly saturated with respect to laser power. A constant 5 Torr of He pressure was maintained. Using a Wrede-Harteck gauge (*Transactions of the Faraday Society,* J. C. Greaves and J. W. Linnett, Vol. 55, p. 1338, 1959) to measure absolute H or D concentration, it was determined that the ionization signal was linearly proportional to all values of H or D concentration between zero and $1.5\times10^{14}$ atoms/cm$^3$. At $1.5\times10^{14}$ atoms/cm$^3$, the signal was on the order of 100 mV, and at $1\times10^{13}$ atoms/cm$^3$, the lower limit of sensitivity of the Wrede-Harteck gauge, the ionization signal was more than a factor of $10^3$ above the noise. The lowest detected signal of 2 μV corresponded to a concentration of $3.5\times10^9$ atoms/cm$^3$. These results demonstrate a dynamic range of $4\times10^4$ with a time resolution on the order of 10 nsec.

Figure 5:
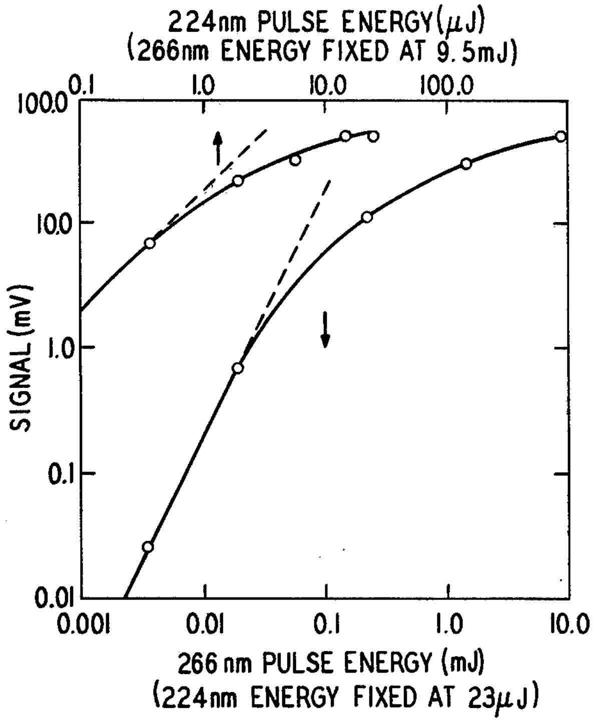
FIG. 5 shows the ionization signal as a function of laser pulse energy at 266 nm with the laser frequency energy at 224 nm held constant at its maximum value and the ionization signal as a function of the laser pulse energy at 224 nm with the laser pulse energy at 266 nm held constant at its maximum value.

The dependence of the ionization signal on the $\omega_1$ and $\omega_2$ power densities was investigated using collinearly propagating beams, focused to a measured spot size of $4\times10^{-4}$ cm$^2$ with coincident beam waist locations. Both beams were far from diffraction limited and the effective length of the waist region was 0.6 cm. The interaction volume was thus $2.4\times10^{-4}$ cm$^3$. FIG. 5 shows the ionization signal as a function of $\omega_1$ pulse energy with $\omega_2$ pulse energy held constant at its maximum value, and as a function of $\omega_2$ pulse energy with the $\omega_1$ pulse energy held constant at its maximum value. Variation of the H or D concentrations was found to affect the absolute signal levels, but did not affect the qualitative behavior of the power dependence. At low powers the ionization signal was proportional to $I_1^2I_2$, where $I_1$ and $I_2$ are defined as the intensities of the $\omega_1$ and $\omega_2$ beams, and thus was unsaturated. (The intensity was taken to be the pulse energy divided by the FWHM pulse duration and by the spot size.) At the maximum pulse energies, which correspond to $I_1=4\times10^9$ W/cm$^2$ and $I_2=2\times10^7$ W/cm$^2$, the signal was strongly saturated with respect to $I_1$ and $I_2$.

Saturation at these power densities is in agreement with calculations based upon the two rate approximation model for resonantly enhanced multiphoton ionization. In this model, the ionization process is regarded as a two-photon absorption of $\omega_1+\omega_2$, causing a real transition from 1S to 2S with rate $W^{(2)}$, cascaded with a single photon absorption of $\omega_1$, causing a real transition from 2S to $\epsilon$P with rate $W^{(1)}$.

Figure 6:
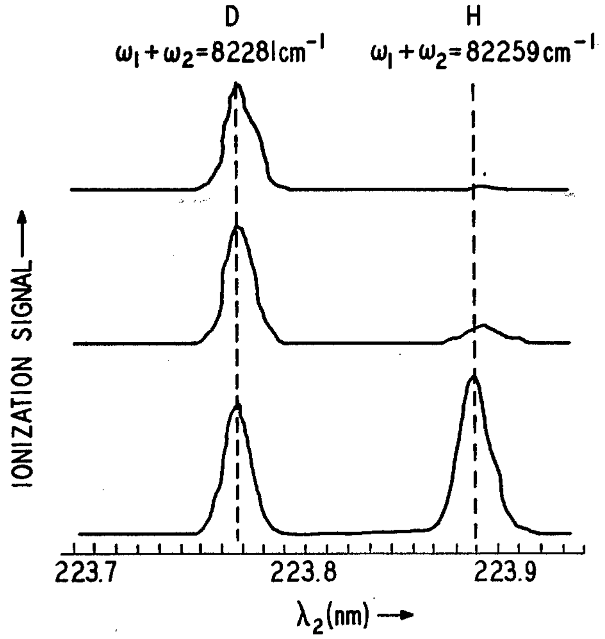
FIG. 6 shows the ionization signal as a function of the wavelength of the laser whose wavelength is tunable about 224 nm under conditions of moderate saturation with respect to intensity.

The ability to distinguish H from D was demonstrated by simultaneously flowing $H_2$ and $D_2$ along with He through the Wood discharge and scanning $\omega_2$. The $D_2$ and He flow rates were kept constant, while the $H_2$ flow rate was set at several values. FIG. 6 shows that the ionization signal was a function of the wavelength of the $\omega_2$ laser under conditions of moderate saturation with respect to intensity. The H and D peaks are well resolved and the signal-to-noise is sufficient to permit accurate comparison of the relative peak heights. If the $\omega_1$ and $\omega_2$ bandwidths were reduced, and the intensities kept below the saturation level, the measured widths of the two-photon resonances would be dominated by Doppler broadening and thus the temperature of the ground state H and D atoms could be determined.

The ability to probe a well defined point in three-dimensional space was demonstrated by using orthogonally intersecting $\omega_1$ and $\omega_2$ beams, each focused to a beam waist diameter of 0.015 cm. An easily detectable signal was observed when the beams intersected, but no signal was observed when the beams were displaced by as little as 0.025 cm, verifying that the ionization signal was obtained from a source volume of (0.015 cm)$^3=3\times10^{-6}$cm$^3$. By translating the location of the region of intersection, the three-dimensional spatial distribution of H or D could be mapped.

Figure 8:
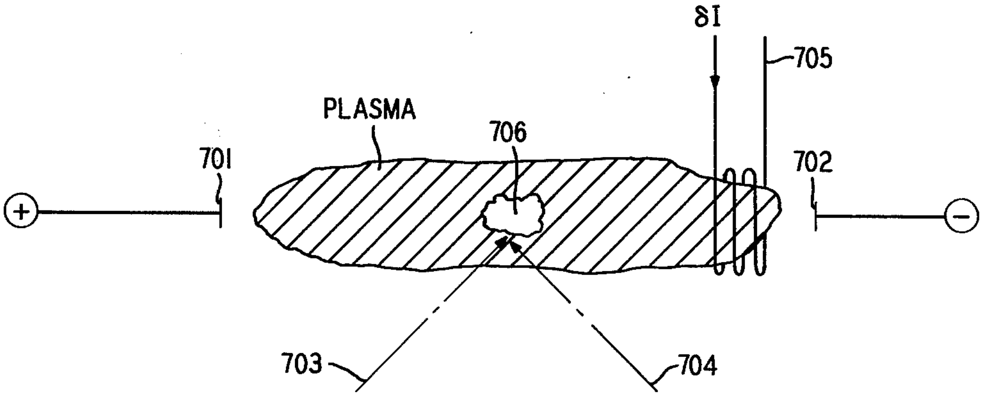
FIG. 8 shows in pictorial form the three-photon ionization process in a plasma discharge.

The principal of operation and efficiency of the invention has been further demonstrated in the embodiment shown in FIG. 9. The principal of operation for this embodiment is depicted in FIG. 8. FIG. 8 shows a discharge plasma formed in hydrogen between electrodes 701 and 702. Photons in beam 703 having a wavelength of 0.266 μm and photons in beam 704 having a wavelength which is tunable about 0.224 μm pump the 1S→2S transition in either atomic hydrogen and atomic deuterium. The more powerful beam at wavelength 0.266 μm then photoionizes the atom from the 2S state. The net result in that a burst of electron-ion pairs are created in the focal region 706 where the two beams overlap and cause a sudden drop in the impedance of the discharge. Since 100 percent ionization in this region can be achieved, a large perturbation of the local electron-ion density results. This change can be detected either as a change in voltage across the plasma δV at electrodes 701 and 702 or by a change in the plasma current detected by current detector 705. The current detection technique has the advantage that it is background free for a dc plasma.

Figure 7:
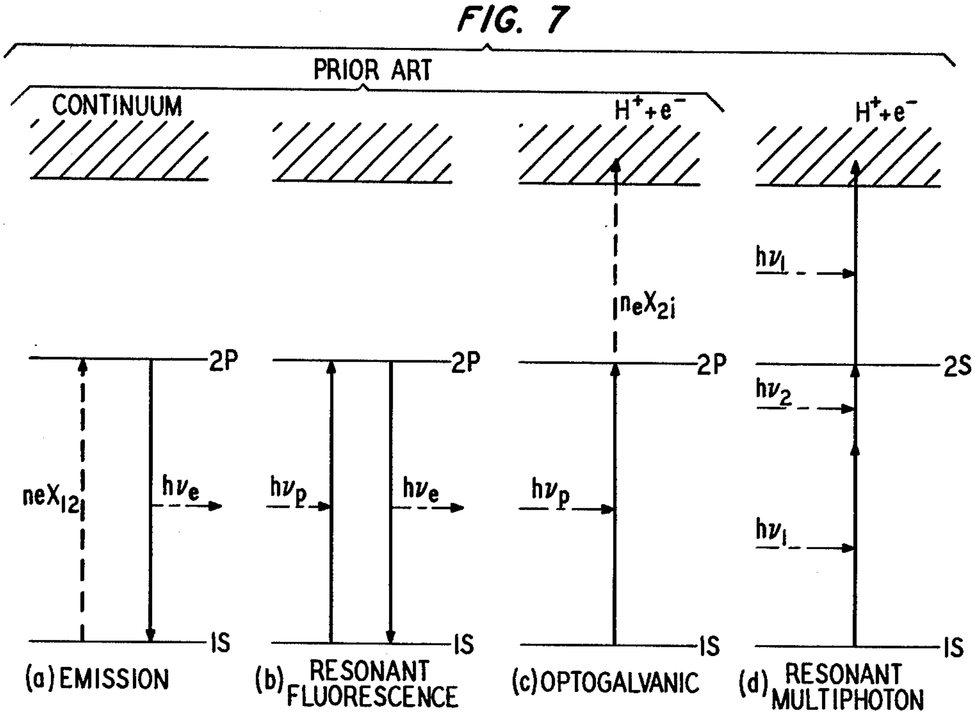
FIG. 7 shows a diagram of four methods of measuring the density of atomic hydrogen.

FIG. 7 in diagrams (a), (b) and (c) shows methods for studying the amount of hydrogen available in a discharge plasma. Method (a) allows measurement of only the excited state population. Both the methods shown in diagrams (b) and (c) have not been realized experimentally for the 1S→2P transitions of hydrogen due to the difficulty involved in generating coherent photons at a wavelength of 1216 Å. The method depicted in diagram (a), whereby the hydrogen is excited to the 2P state by electron collision and radiates back to the ground state, is limited because of the difficulties of detecting the resultant radiation and the difficulties due to the absorption of the emitted radiation in the plasma itself. We note that the method of the present invention as depicted in diagram (d) solves the problems presented by the prior art in the manner that has been described hereinabove.

FIG. 9 depicts the embodiment in which the efficiency of the present invention as applied to a dc discharge plasma has been demonstrated. A dc discharge was generated by applying a 1 kV voltage across a 6 inch length of 1 cm ID tubing 801 and a 10 kΩ ballast resistor 802. Two collinear laser beams, beam 803 having radiation at 0.266 μm at 1 MW and beam 804 having radiation tunable about 0.224 μm having 10 kW of power were generated as shown in FIG. 2 and focused to a spot in column 801 halfway between electrodes 806 and 807. The pulsed beams of light 803 and 804 having ~5 nsec duration, photoionized the atomic hydrogen in the focal region of the beams by three-photon ionization. The burst of ions and electrons created thereby caused a sudden drop in the impedance of the discharge which was observed as a voltage pulse across ballast resistor 802. Capacitor 808 was used to block the dc voltage on the ballast resistor and the transient voltage was observed on oscilloscope 809. At full laser power, signals as large as twenty volts were observed when beam 804, tunable about 0.224 μm, was tuned to resonate with the 1S→2S two-photon transition (the $H_2$ pressure was ~1 Torr).

Figure 10:
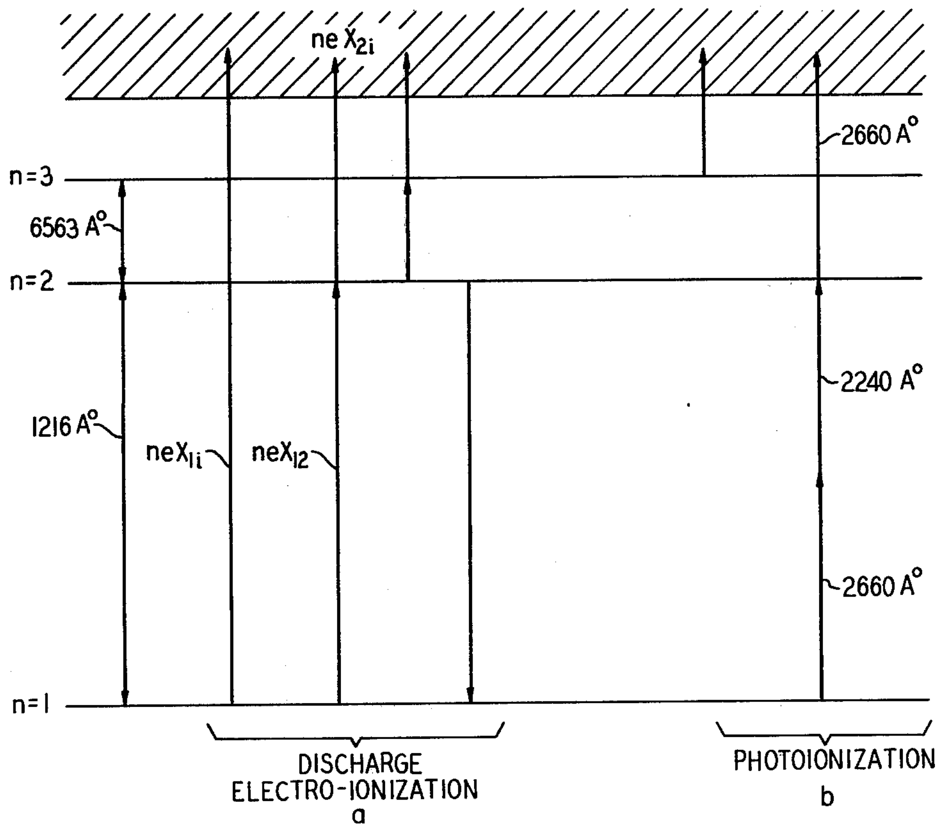
FIG. 10 shows a diagram of the excitation process for discharge electro-ionization as compared to three-photon ionization in a plasma discharge.

FIG. 10 is a schematic diagram showing the competing mechanisms which result in ionization in the plasma. Diagram (a) illustrates the process of ionization in the discharge which is the result of electron collision processes. However, in the discharge conditions discussed for the embodiment shown in FIG. 9, we would expect the intensity of electrons to be quite low $\sim 10^8$–$10^9$ electrons/cm$^3$ at a discharge current of 100 mA. Saturation measurements made in the absence of a discharge show that 100 percent of the atoms in the focal volume are ionized by the embodiment of the present invention as illustrated in diagram (b). The estimated interaction volume for the two beams is $\sim 10^{-4}$ cm$^3$. We can estimate the number of electron-ion pairs created per pulse by multiplying the $H_2$ density, the number of atoms per $H_2$ molecule, the fraction of molecules which are dissociated in the plasma, and the interaction volume. Given an $H_2$ density of approximately $3\times10^{-16}$ molecules/cm$^3$ and assuming 100 percent dissociation of $H_2$ molecules in the discharge, it is estimated that $6\times10^{12}$ electron-ion pairs are created per pulse. This is a large perturbation of the local electron density.

This application of the invention to plasma discharges provides an efficient method of determining the percentage of ground state atomic hydrogen or ground state atomic deuterium. We also note in diagram (b) of FIG. 10, that the laser beams will also photoionize atoms that have been excited to higher states by electron collision processes. This allows one to measure the relative concentrations of atoms of hydrogen in the ground state as compared to atoms in excited states. This has been demonstrated in the apparatus shown in FIG. 9. As indicated in FIG. 10, the excited states of the H atoms in a plasma are populated by electron collisions. By irradiating the plasma with radiation having $\lambda=266$ nm alone, only the excited H or D atoms are ionized. When the power of the radiation at this wavelength is sufficient to ionize all the excited atoms, the resultant voltage signal is proportional to the total excited state population. If we irradiate the plasma with radiation having two components which are resonant with the 1S→2S ground state transition in H and with power sufficient to saturate the transition we obtain a signal proportional to the total ground state plus the excited state population.

The excited state population in the discharge is proportional to the electron density and, hence, to the discharge current. However, the ground state plus the excited state population is independent of the discharge current. The ability to probe ground state and excited state populations of H in the plasma has been demonstrated by measuring the current dependence of the signals obtained with radiation at $\lambda=266$ nm alone and with radiation having two components which are resonant with the 1S→2S ground state transition. Over a current range of 10 mA–150 mA the signal obtained using radiation with $\lambda=266$ nm alone (to probe the excited state) increased linearly while the signal obtained using the radiation with the two components remained constant. The fact that the signal obtained with radiation at $\lambda=266$ nm was proportional to the excited state population of H was verified by monitoring the emission of the $H_\alpha$ line at 6563 Å and showing that the optogalvanic signal and emission intensity were linearly proportional.

The principles embodied in the present invention also provide a method for probing the three dimensional thermal distribution of ground state H or D atoms in the discharge plasmas. The linewidth of the 1S→2S ground state transition is dominated by Doppler broadening which exhibits a $\sqrt{T}$ dependence. The Doppler width can be determined by scanning the tunable radiation about 224 nm in the presence of the radiation at 266 nm and measuring the width of the resultant signal. This will give a measure of the temperature of the ground state atoms in a localized region of the plasma where the two beams of radiation overlap.

What is claimed is:

1. Apparatus for detecting small concentrations of ground state atomic hydrogen and atomic deuterium comprising:

a first laser source of a beam of photons each one of which has a first energy less than the energy difference between the 1S and 2S states of atomic hydrogen and atomic deuterium, said first energy being greater than the energy difference between the 2S state and the continuum of said atomic hydrogen and said atomic deuterium;

a second laser source of a beam of photons each one of which has a second energy which is different from said first energy and which is tunable in such a manner that a sum with said first energy is substantially equal to said energy difference between the 1S and 2S states of atomic hydrogen or atomic deuterium;

means for applying the beam from said first laser source and the beam from said second laser source to substantially the same volume at the same time, whereby said atomic hydrogen or said atomic deuterium is ionized by two photons from said first laser source and one photon from said second laser source and the ionization is enhanced by the fact that the sum of said first energy and said second energy is substantially equal to said energy difference between the 1S and 2S states;

means for collecting the ions of said atomic hydrogen or said atomic deuterium; and means for generating an electric signal in response to said collection of said ions to detect said small concentrations.

2. Apparatus as defined in claim 1 wherein the beam from said first laser source has a wavelength equal to 266 nm.

3. Apparatus as defined in claim 2 wherein said first laser source is a Nd:YAG laser and the beam from said first laser source is the fourth harmonic of said Nd:YAG laser.

4. Apparatus as defined in claim 3 wherein said second laser source is tunable about a wavelength equal to 224 nm.

5. Apparatus as defined in claim 4 wherein said second laser source which is tunable about a wavelength equal to 224 nm comprises:

means for extracting a fundamental and a second harmonic from said Nd:YAG laser;

a tunable dye laser-amplifier, pumped by said second harmonic of said Nd:YAG laser, for producing a first laser output tunable about a wavelength equal to 566 nm;

a first nonlinear crystal, exposed to said first laser output tunable at 566 nm, for producing a second laser output tunable about a wavelength equal to 283 nm;

a second nonlinear crystal, exposed to said second laser output tunable about a wavelength equal to 283 nm and said fundamental, for summing said second laser output tunable about a wavelength equal to 283 nm and said fundamental to produce said second laser beam which is tunable about a wavelength equal to 224 nm.

6. Apparatus as defined in claim 1 for spatially mapping the three dimensional concentration of ground state atomic hydrogen and atomic deuterium wherein said means for applying said first laser beam and said second laser beam causes said first laser beam and said second laser beam to intersect.

7. Apparatus for detecting small concentrations of ground state atomic hydrogen and atomic deuterium in a discharge plasma comprising:

a first laser source of a beam of photons each one of which has a first energy less than the energy difference between the 1S and 2S states of atomic hydrogen and atomic deuterium, said first energy being greater than the energy difference between the 2S state and the continuum of said atomic hydrogen and said atomic deuterium;

a second laser source of a beam of photons each one of which has a second energy which is different from said first energy and which is tunable in such a manner that a sum with said first energy is substantially equal to said energy difference between the 1S and 2S states of atomic hydrogen or atomic deuterium;

means for applying the beam from said first laser source and the beam from said second laser source to substantially the same volume at the same time, whereby said atomic hydrogen or said atomic deuterium is ionized by two photons from said first laser source and one photon from said second laser source thereby causing a change in the impedance of said discharge plasma, the ionization being enhanced by the fact that the sum of said first energy and said second energy is substantially equal to said energy difference between the 1S and 2S states; and means for generating an electric signal in response to said change in the impedance of said discharge plasma to detect said small concentrations.

* * * * *